Figure 1:
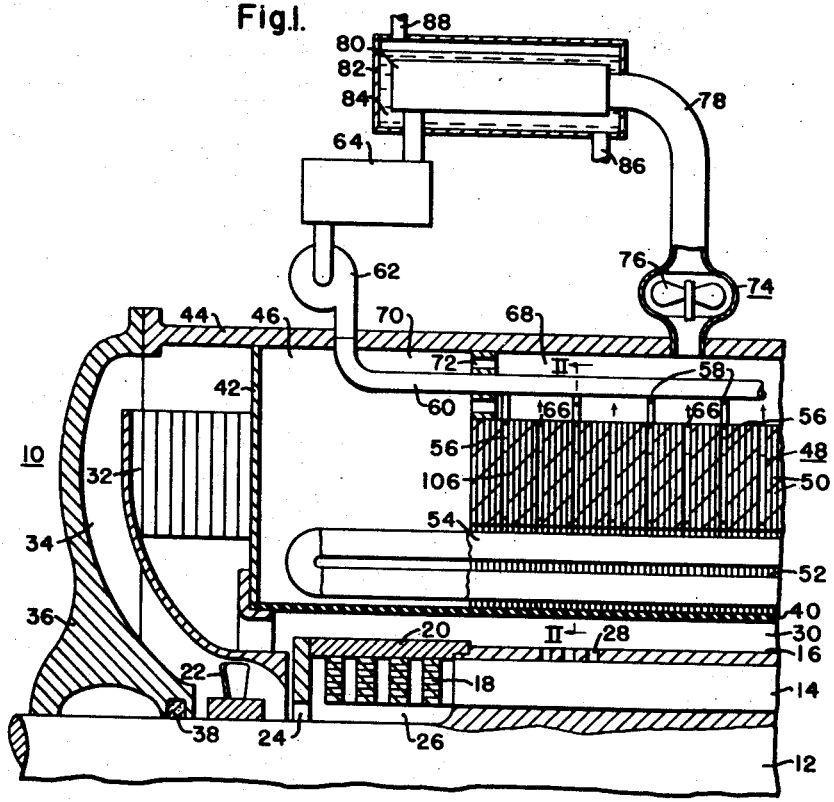

July 24, 1951  C. F. HILL  2,561,737

COOLING DYNAMOELECTRIC APPARATUS

Filed March 26, 1949

WITNESSES:

INVENTOR
Charles F. Hill.
BY
Frederick Shapoe
ATTORNEY

Patented July 24, 1951

2,561,737

UNITED STATES PATENT OFFICE 2,561,737

COOLING DYNAMOELECTRIC APPARATUS

Charles F. Hill, Pittsburgh, Pa., assignor to Westinghouse Electric Corporation, East Pittsburgh, Pa., a corporation of Pennsylvania Application March 26, 1949, Serial No. 83,567

5 Claims. (Cl. 171—252)

This invention relates to dynamoelectric apparatus and particularly large generators requiring a means for dissipating large quantities of heat developed during the operation of the apparatus.

One limitation in the size, capacity and efficiency of large generators is the heat developed during the operation of the apparatus. In large generators, the dissipation of the heat is a serious problem and is related to the over-all efficiency of the apparatus as well as the life of the insulation. In order to remove the maximum amount of heat with a minimum of windage loss, large generators, i. e., above 10,000 kva., are almost universally produced with a sealed casing and a gas such as hydrogen circulated within the casing to remove the heat from the windings. However, even hydrogen cooling of large generators has limitations inasmuch as large gas ducts and high gas velocities are necessary.

In large generators, ordinarily the major portion of the heat generated during operation is generated in the stator proper, and only a minor part of the heat is developed in the rotor. Therefore, a low molecular weight, high heat capacity gas, such as hydrogen, is effective in dissipating the heat of the rotor without too serious problems even in the largest sizes of generators being manufactured today or contemplated for manufacture in the near future. However, removal of heat from the stator constitutes a problem, and in many cases dissipation of heat solely by employing the heat capacity of a gas such as hydrogen is not as effective as with the rotor and results in considerable design and engineering problems.

The present invention is related to my copending applications, Serial Nos. 58,662 and 58,663, now abandoned, filed November 6, 1948, wherein there is disclosed the cooling of enclosed electrical apparatus by the use of liquid fluorocarbons having a boiling point of between 50° C. and 150° C. at atmospheric pressure whereby the major portion of the cooling is effected by evaporation of the liquid fluorocarbon.

The object of the present invention is to provide for the efficient dissipation of heat generated in the stators of dynamoelectric apparatus by evaporation of a liquid fluorocarbon and to cool the rotor of the apparatus with a suitable low windage loss, low molecular weight gas.

A further object of the invention is to provide dynamoelectric apparatus with separate sealed enclosures for the rotor and stator, respectively, whereby a low molecular weight, low windage loss gas may be employed for cooling the rotor to minimize windage losses and to employ a vaporizable liquid fluorocarbon for cooling the stator.

A still further object of the invention is to provide apparatus for enabling cooling of stators by evaporation of liquid fluorocarbons.

Figure 2:
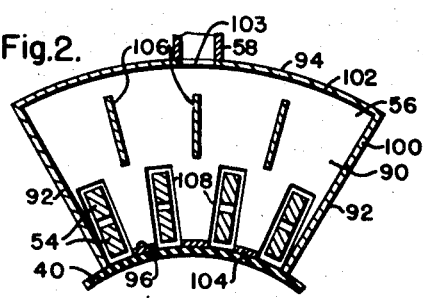

Other objects of the invention will, in part, be obvious and will, in part, appear hereinafter. For a better understanding of the nature and objects of the invention, reference should be had to the following detailed description and drawing, in which:

Figure 1 is a fragmentary, vertical cross-section through a dynamoelectric machine constructed in accordance with the invention, and Fig. 2 is a fragmentary, vertical cross-section on line II—II of Fig. 1.

In accordance with the present invention, dynamoelectric apparatus, and generators in particular, are provided with separate relatively gastight enclosures for the stator and the rotor, the enclosures including a partition separating the rotor and stator, wherein the enclosure surrounding the rotor contains a low molecular weight, high heat capacity gas, such as hydrogen or helium, for cooling the rotor and its associated windings to dissipate the heat generated during operation, and the enclosure surrounding the stator contains means for distributing a liquid fluorocarbon having a boiling point of between 50° C. and 150° C. at atmospheric pressure over the stator windings and laminations so that the liquid fluorocarbon absorbs heat from the stator. In absorbing the heat developed in the stator, the liquid fluorocarbon vaporizes and the fluorocarbon vapors are withdrawn and delivered to a condenser where the fluorocarbon vapors are cooled by suitable means and condensed into liquid fluorocarbon for further recirculation through the stator core and windings. The major cooling of the stator is accomplished by the evaporative cooling effect of the fluorocarbon liquid relying on the latent heat of vaporization of the fluorocarbon for absorbing most of the excess heat of the stator. Since the stator does not move, there is no problem of windage losses, and such liquid fluorocarbons may be employed with highly satisfactory results.

The use of a fluorocarbon liquid in accordance with the present invention solves the problem of stator cooling to such a degree that generators having a size corresponding to a standard, all-hydrogen, gas-cooled generator may be operated at much higher outputs with prospects of attaining considerable increases in the output for a given size in the larger machines of the order of 10,000 kilowatts and larger. However, the invention may be used with benefit in smaller machines.

Several methods are feasible for distributing the liquid fluorocarbon over the stator laminations and windings. Thus, perforated tubes conveying the fluorocarbons may be buried in the stator windings or in the stator slots and the liquid fluorocarbon flowing through the perforations cools the windings and adjacent portions of laminations. Another method is to spray liquid fluorocarbon over the stator bore whereby the liquid fluorocarbon works past the windings into the stator core.

For a particularly effective cooling system, reference should be made to Fig. 1 of the drawing, illustrating a generator 10 operating in accordance with the principles of the present invention. The generator 10 comprises a rotor shaft 12 carrying rotor windings 14 retained within a slot by wedges 16. Since the rotor shaft 12 ordinarily operates at speeds of from 1800 to 3600 R. P. M. the construction of the rotor and all parts rotating with it must be rugged enough to withstand the centrifugal forces involved. The end windings 18 of the winding 14 are accordingly enclosed by a heavy retaining ring 20. Mounted on the shaft 12 is a fan 22 for circulating and directing a stream of a gas, such as hydrogen, through a peripheral aperture 24 and channel 26 to end windings 18 and thence to the slot portions of the windings 14. In passing over the end windings 18 and the windings 14 proper, the hydrogen absorbs excess heat and then escapes through aperture 28 in the wedges 16, into a passageway 30 from whence the heated hydrogen travels to a cooler 32, which may be supplied with water for removing the heat from the hydrogen and cooling it for return to an inlet passage 34 leading back to the fan 22 for recirculation. The space about the rotor is a substantially gas-tight, sealed enclosure defined by the end bell 36 provided with suitable sealing means 38 cooperating with the shaft 12, a partition 40 separating the rotor from the stator, and a suitable metal diaphragm 42 affixed hermetically to the main casing 44 surrounding the entire generator.

Within an enclosed chamber 46 defined by the partition 40, diaphragm 42 and the main casing 44, is disposed a stator 48 comprising a plurality of stacked laminations 50 provided with slots 52 within which are disposed stator windings 54. The stacked laminations 50 are assembled in spaced groups so that spaced passages 56 and 66 are present at short intervals between the groups of laminations. The passages 56 are arranged for liquid to pass therethrough while the passages 66 are arranged for vapor outlet. The passages 56 and 66 are relatively narrow, in many instances only 0.01 to 0.02 inch between groups is suitable. Leading to and connected fluid-tightly to each of the passages 56 is an inlet duct 58 connected to a fluid header 60 supplied with fluid by a pump 62 from a reservoir 64 preferably containing a liquid fluorocarbon having a boiling point of between 50° C. and 150° C.

The liquid fluorocarbon entering the header 60 and passing to the inlet ducts 58 flows into the passages 56 and by contact absorbs any excess heat present in the laminations 50, and then the liquid fluorocarbon flows into the slots 52 and is distributed over the windings 54, the windings in operation being at a relatively high temperature with respect to the liquid fluorocarbon so that the fluorocarbon boils and fluorocarbon vapors so generated travel through the slots 52 to the adjacent vapor outlet passages 66 and escape radially into the chamber 68. Some fluorocarbon vapor will escape past the ends of the stator windings into the portion 70 of the chamber 46. Vapor in the portion 70 may pass into the vapor chamber 68 through suitable openings 72. Fluorocarbon vapor in the vapor chamber 68 is withdrawn by a pump 74, which comprises a motor-driven fan 76, and directed through the conduit 78 to the condenser 80 where the fluorocarbon vapor is cooled and condensed into the liquid and thence delivered to the storage tank 64. The condenser 80 may comprise a casing 82 containing a suitable cooling fluid 84 such as water delivered from a suitable outside source through the inlet 86, and the hot water escapes from the casing through the outlet 88. While the condenser pumps and storage tank 64 are illustrated as being outside of the generator casing 44, it will be appreciated that they may be attached to or disposed in the stator or entirely within the casing 44, as, for example, in the portion 70.

While various means may be employed for distributing the liquid fluorocarbon from the inlet 58 into the passages 56, the liquid distributor structure of Fig. 2 is one form of suitable structure. The liquid distributor structure may comprise two parallel plates 90 separated from one another a small distance of the order of from 0.01 to 0.02 of an inch or more, the plates 90 having radial sides 92, an arc-shaped top 94 and an arc-shaped bottom portion 96. The plates 90 are sealed together as illustrated by means of a thin spacer member 100 placed at the radial sides 92 and at the top 94 by an arc-shaped spacer member 102 having an opening 103 fitting to the inlet 58 to provide for entry of liquid fluorocarbon. The plates 90 are provided with at least one slit 108 corresponding to the cross-section of a slot 52, extending from the bottom portion 96 for accommodating the windings 54. The bottom portion 96 of the plates 90 is sealed with strips 104 between the slot portions only. If required, a plurality of strips 106 may be disposed internally over the surface between the plates 90 to prevent their collapse. The whole structure resembles a fan-shaped nozzle in appearance and in function so that liquid fluorocarbon from the inlet 58 fills the space 56 between the plates 90 and thence is directed to the slots 108 where it flows over the windings 54 and thence escapes.

For the vapor escape spaces 66, a similar structure without the strips 102 and 104 is adequate. Since the volume of the vapor greatly exceeds the volume of the liquid, the top sides of the plates are completely open.

Liquid fluorocarbons having a boiling point of between 50° C. and 150° C. are highly effective insulators. The vapors of such liquid fluorocarbons have been found to be superior to practically all known gaseous insulators.

Suitable fluorocarbons for the practice of the invention are those compounds of only fluorine and carbon that boil in the range of 50° C. and 150° C. at atmospheric pressure. Examples of suitable fluorocarbon compounds are: perfluoromethylcyclohexane, perfluorodimethylcyclohexane, perfluoroheptane, perfluorooctane, perfluorohexane, perfluorotoluene, perfluoropropylcyclohexane, perfluoroethylcyclohexane, and perfluorodiethylcyclohexane. The freezing point of many of these listed liquid fluorocarbons is considerably below zero degrees centigrade so that they can be safely employed under nearly all ambient conditions to be expected in service. Mixtures of these fluorocarbons have lower freezing points than the individual fluorocarbons. The specification hereafter will refer particularly to perfluoromethylcyclohexane as an example of a suitable fluorocarbon, but it will be understood that other fluorocarbons may be substituted in whole or in part therefor, and mixtures of two, three or more fluorocarbons, each having a boiling point in a range of 50° C. to 150° C. may be used effectively. The physical properties of perfluoromethylcyclohexane are as follows:

Boiling point, 76.3° C.
Heat of vaporization, 22 calories per gram at the boiling point
Specific heat, 0.2 calory per gram
Density, 1.8
Freezing point, below —50° C.

The surge impulse strength of the fluorocarbons is outstanding. Vapors of perfluoromethylcyclohexane will withstand better than three times, on the average, the voltage surge that nitrogen will withstand. This property is highly advantageous and enhances the reliability of apparatus constructed in accordance with the present invention.

It is contemplated that mixtures of two or more fluorocarbons will be employed. The mixture of fluorocarbons may have advantages in that it will contain one relatively-low boiling point component which will evaporate readily even at low load conditions while the higher boiling component will evaporate when the load on the dynamoelectric apparatus reaches its maximum. It will be appreciated that any unevaporated liquid fluorocarbon will simply escape by dripping or running off the windings into the downward portions of the outlet spaces 66. A liquid pump should be disposed at the bottom of the generator casing 44 to pick up any unevaporated liquid fluorocarbon and return it to the storage tank 64.

Since certain changes in carrying out the process embodied in the invention described herein may be made without departing from its scope, it is intended that all matter contained in the above description shall be interpreted as illustrative and not in a limiting sense.

I claim as my invention:

1. In the process of dissipating heat from a stator comprising a plurality of magnetic laminations assembled in spaced relation to provide interlaminar spaces at intervals and a winding disposed in slots in the laminations, the steps comprising introducing a liquid fluorocarbon having a boiling point of between 50° C. and 150° C. at atmospheric pressure into the interlaminar spaces provided between some laminations, causing the liquid fluorocarbon to flow to the slots and to contact the winding whereby the heat in the laminations and the winding causes evaporation of the liquid fluorocarbon and the vapors escape from the slots, collecting the fluorocarbon vapors and condensing the vapors to liquid fluorocarbon.

2. In the process of dissipating heat from a stator comprising a plurality of magnetic laminations separated at intervals to provide interlaminar spaces and a winding disposed in slots in the laminations, the steps comprising introducing a liquid fluorocarbon having a boiling point of between 50° C. and 150° C. at atmospheric pressure into the spaces between some laminations, causing the fluid fluorocarbon to flow to the slots and to contact the winding whereby the heat in the laminations and the winding causes evaporation of the liquid fluorocarbon, withdrawing the fluorocarbon vapors through interlaminar spaces other than the spaces through which the liquid was introduced, and condensing the withdrawn vapors into liquid fluorocarbon for reuse.

3. In a dynamoelectric machine comprising a rotor and a stator each provided with windings, the stator comprising a plurality of stacked laminations with slots therein for accommodating the stator winding, in combination, substantially gas-tight enclosures surrounding the rotor and stator including a gas-tight partition separating the rotor and stator, a permanent gas being disposed in the enclosure about the rotor for cooling the rotor, the stator laminations being stacked in spaced groups, a cooling liquid distributing means being disposed in a part of the spaces between groups of laminations, the liquid distributing means having an outlet leading to the stator windings and to the slots in adjacent groups of laminations, the remaining spaces between groups of laminations enabling escape of vapors from the windings and slots, a condenser connected to the enclosure surrounding the stator, and means for withdrawing vapors from said remaining spaces and delivering the vapors to a condenser for condensation to a liquid to be delivered to the liquid distributing means.

4. In a dynamoelectric machine comprising a rotor and a stator each provided with windings, the stator comprising a plurality of stacked laminations with slots therein for accommodating the stator winding, in combination, substantially gas-tight enclosures surrounding the rotor and stator including a gas-tight partition separating the rotor and stator, a permanent gas being disposed in the enclosure about the rotor for cooling the rotor, the stator laminations being stacked in spaced groups, a cooling liquid distributing means being disposed in a part of the spaces between groups of laminations, the liquid distributing means having an outlet leading to the stator windings and to the slots in adjacent groups of laminations, a liquid fluorocarbon having a boiling point of between 50° C. and 150° C. at atmospheric pressure being supplied to the liquid distributing means, the remaining spaces between groups of laminations enabling escape of fluorocarbon vapors from the windings and slots, a condenser connected to the enclosure surrounding the stator, and means for withdrawing fluorocarbon vapors from said remaining spaces and delivering the fluorocarbon vapors to a condenser for condensation to a liquid fluorocarbon to be delivered to the liquid distributing means whereby the rotor is cooled by a permanent gas and the stator is cooled by the evaporation of the liquid fluorocarbon.

5. A fluid distributing spacer comprising two parallel plates having radial sides and arc-shaped top and bottom sides, at least one radial slot extending from the bottom side, the radial sides of the plates being sealed, the top side being sealed except for an opening and the bottom side being sealed between the slots only whereby liquid introduced into the opening in the top side will be conveyed to and released only at the radial slot.

CHARLES F. HILL.

REFERENCES CITED

The following references are of record in the file of this patent:

FOREIGN PATENTS

| Number | Country | Date |
| --- | --- | --- |
| 165,806 | Great Britain | July 11, 1921 |
| 484,371 | Great Britain | May 4, 1938 |